(No Model.)
J. F. McLAUGHLIN.
SECONDARY BATTERY ELECTRODE.
No. 425,819. Patented Apr. 15, 1890.
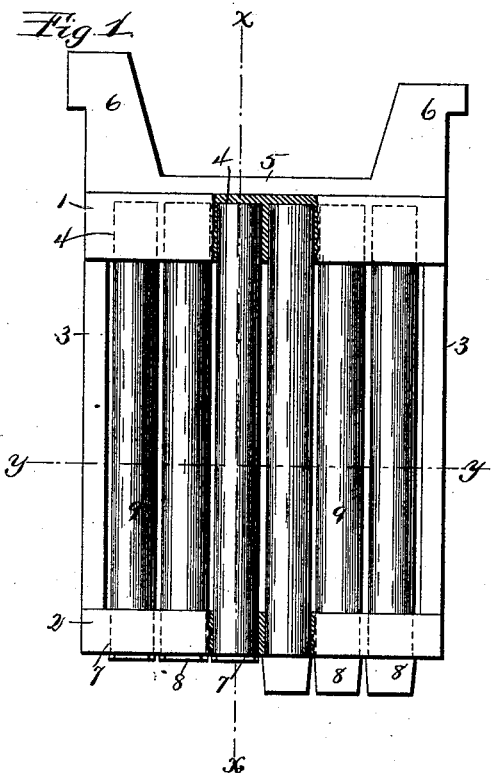
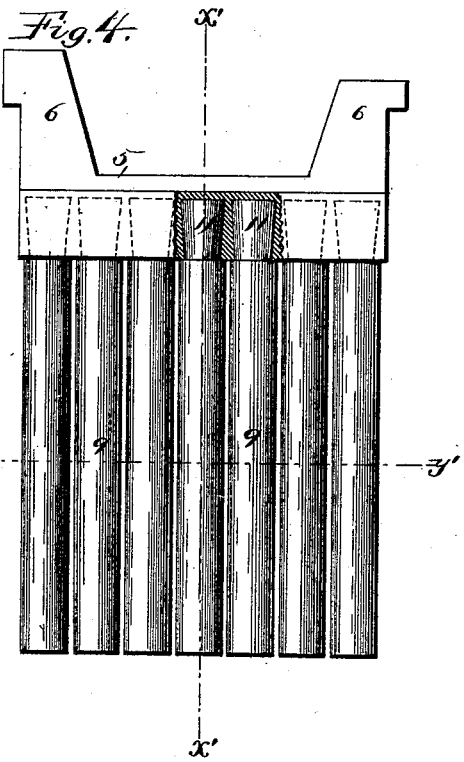
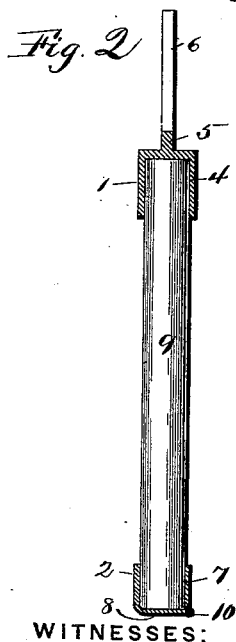
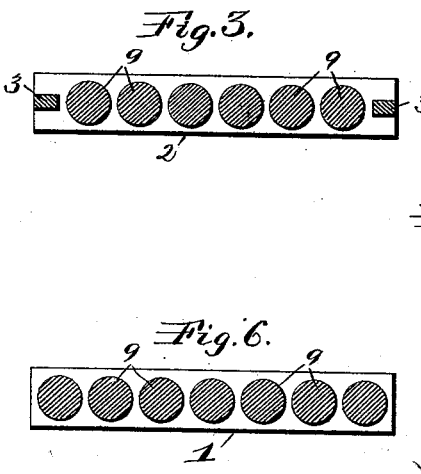
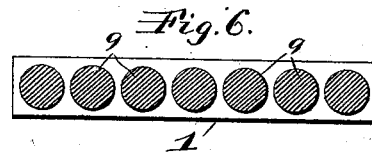
WITNESSES:
Percy C. Bowen
F. T. Chapman
INVENTOR.
James F. McLaughlin,
By Joseph Lyons
Attorney

UNITED STATES PATENT OFFICE.

JAMES F. McLAUGHLIN, OF PHILADELPHIA, PENNSYLVANIA.

SECONDARY-BATTERY ELECTRODE.

SPECIFICATION forming part of Letters Patent No. 425,819, dated April 15, 1890.

Application filed January 8, 1890. Serial No. 336,246. (No model.)

*To all whom it may concern:*

Be it known that I, JAMES F. MCLAUGHLIN, a citizen of the United States, and a resident of Philadelphia, in the county of Philadelphia and State of Pennsylvania, have invented certain new and useful Improvements in Secondary-Battery Electrodes, of which the following is a specification.

This invention has reference to electrodes for secondary batteries, and its object is to produce an electrode having a large surface of active material exposed to the action of the electrolyte, and at the same time the said active material is so disposed and held that it will not crack or flake off when subjected to vibrations of a traveling vehicle carrying the same.

The improved electrode is illustrated in the accompanying drawings, in which—

Figure 1 is an elevation of an electrode constructed according to my invention and having a portion of the frame-work removed or broken away to illustrate the manner in which the active material is supported in such frame. Fig. 2 is a section on the line $x\,x$ of Fig. 1. Fig. 3 is a transverse section on the line $y\,y$ of Fig. 1. Fig. 4 is an elevation of a modified form of electrode, a portion of the supporting-frame being broken away to show the manner in which the active material is supported. Fig. 5 is a section on the line $x'\,x'$ of Fig. 4, and Fig. 6 is an inverted view of a transverse section on the line $y'\,y'$ of Fig. 4.

Like numerals of reference indicate like parts all throughout the drawings.

Referring now to the drawings, and more especially to Figs. 1, 2, and 3, there is shown a frame composed of a head 1, a foot 2, and connecting side bars 3 3, the whole being preferably constructed of lead and cast in one piece.

The head consists, essentially, of a rectangular block, in which are a number of sockets 4, extending into it from the lower side or face, and centrally along the upper side or face of the head is a rib 5, merging at each end into an angle-piece or arm 6, cast on the upper face of the head 1, the said arms serving to support the complete electrode in a containing jar or vessel, and one of the arms has an enlarged upper end for the attachment of the conductor or a binding-post.

The foot 2 consists of a rectangular block similar in size and shape to the head 1 and pierced by a number of perforations 7 7, equal in number to the sockets 4, formed in the head. Projecting downward from the under side or edge of the foot 2 are a number of flaps 8, equal in number to and at one side of the perforations 7 7 and of such size and length that when bent upward against the under face of the foot they will close the lower ends of the said perforations 7. The side bars 3 serve to connect the head 1 and foot 2 and hold them at a fixed distance apart. The active material is in the form of cylindrical rods or bars 9, of such length that when inserted through the perforations 7 in the foot 2 their upper ends will be seated in the sockets 4 in the head 1, while their lower ends are flush with the bottom of the said foot 2, and there will be a narrow passage between the rods, as shown. The flaps 8 are then turned upward against the foot 2 to confine the rods of active material in the frame, and the edges of the flaps are soldered to the foot 2, as indicated at 10, to prevent accidental displacement of the said bars. This latter precaution, however, is not necessary when the flaps are sufficiently stiff to overcome any tendency of the bars of active material to force them away from the bottom of the foot 2.

It will be evident that with an electrode constructed as described a very large surface of active material is exposed to the action of the electrolyte, while at the same time it is so mounted in the frame that it is not injuriously affected by shocks and vibrations so as to break it away from its support.

I prefer to mold and press the bars of active material into shape, employing for this purpose an emulsion of red oxide of lead, plaster-of-paris, and dilute sulphuric acid, and then subject them to the action of heat until thoroughly baked. By this means I obtain an extremely hard and durable mass of active material in the desired form for mounting it in the frame described.

Referring now to Figs. 4, 5, and 6, there is shown an electrode in which the foot and side bars described with relation to the other figures of the drawings are dispensed with and a supporting-frame composed of the head 1 only is employed, the rods of active material being secured at their upper ends and free at the lower ends. In this instance the rods 9 of active material are constructed with one end undercut, so as to present a dovetail in axial section, as shown at 11. A number of these rods are placed in a suitable mold, and the head 1 is cast around the dovetail ends 11, so that the rods 9 are securely locked in the said head and can only be removed therefrom by breaking them. The head in this instance is otherwise similar to that shown in Fig. 1, having the central rib 5 and arms 6. In this form of electrode the rods 9 are spaced, as described with reference to the other form, so that there are passages between them for the circulation of the electrolyte, and while in the construction shown in Fig. 4 there is no support for the lower end of the rods, still, when formed of the composition described, they are of such durable nature that there is little or no liability of their being broken from the head 1.

Having now fully described my invention, I claim and desire to secure by Letters Patent—

1. An electrode for secondary batteries, consisting of a supporting-head of conducting material and a series of rods composed of binding and active material, the said rods being held at one end in the said head, substantially as described.

2. An electrode for secondary batteries, consisting of a frame of metal comprising a head with a series of sockets and a foot having a corresponding series of perforations, and a series of rods containing active material extending with their ends into the said sockets and perforations, substantially as described.

3. An electrode for secondary batteries, consisting of a supporting-frame of metal and bars or rods composed of red lead, plaster-of-paris, and dilute sulphuric acid, spaced and held at their ends in the said frame, substantially as described.

4. In an electrode for secondary batteries, the combination of a frame consisting of a head having a series of sockets, a foot having a series of perforations, with flaps for covering one end of such perforations, and side bars connecting the head and foot of the frame, with bars or rods containing active material seated in the sockets in the head and in the perforations in the foot, and confined in said frame by the flaps covering the ends of the said perforations, substantially as described.

In testimony whereof I have signed my name to this specification in the presence of two subscribing witnesses.

JAMES F. McLAUGHLIN.

Witnesses:
H. F. REARDON,
WILSON R. KER.